Figure 1:
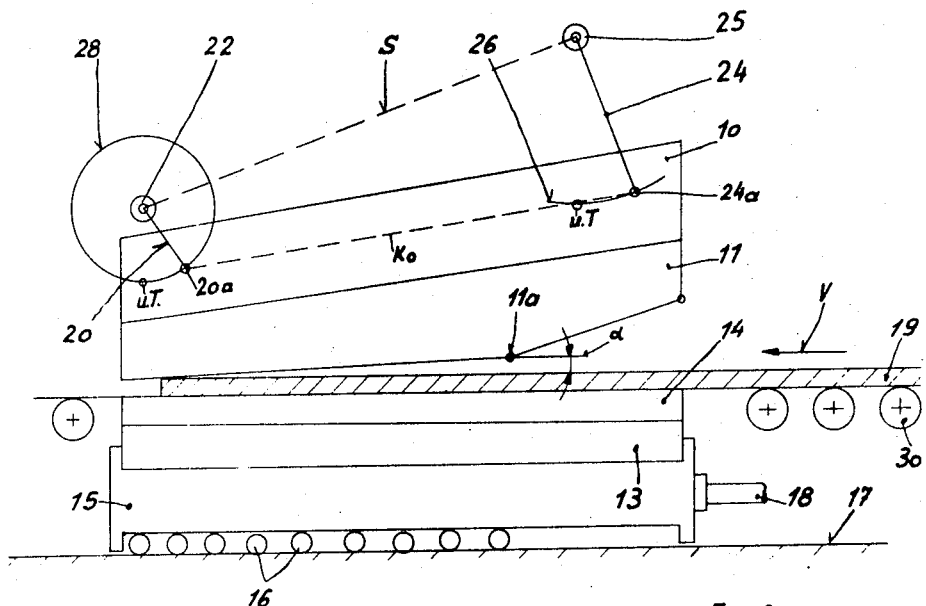

United States Patent [19]
Fries et al.

[11] 3,741,059
[45] June 26, 1973

[54] FLYING SHEARS FOR TRIMMING METAL PLATES AND SHEETS

[75] Inventors: Günther K. Fries, Neunkirchen/Saar; Ernst-Günther Oberhauser, Rohrbach/Saar; Friedel Betz, St. Ingbert/Saar, all of Germany

[73] Assignee: Moeller & Neuman, St. Ingbert/Saar, Germany

[22] Filed: Sept. 15, 1971

[21] Appl. No.: 180,690

[52] U.S. Cl................... 83/315, 83/284, 83/321, 83/647.5
[51] Int. Cl............................................. B23d 25/10
[58] Field of Search.................. 83/647.5, 646, 644, 83/303, 284, 321, 315

[56] References Cited
UNITED STATES PATENTS
2,551,876  5/1951  Cronin .............................. 83/647.5

Primary Examiner—J. M. Meister
Attorney—John J. Dennemeyer

[57] ABSTRACT

A flying shears for trimming plates or sheets has an upper cutter carrier which is connected at its plate exit end to a continuously rotating crank, and at its plate inlet end to a rocker member. The upper cutter has a straight cutting edge which may have an extension directed away from the plate feed plane. The lower cutter may have a straight cutting edge and may be displaceable in and against the plate feed direction by a drive which permits the cutting forces to modify the plate speed. Alternatively the lower cutter may have a curved cutting edge and may be displaceable in a similar manner to the upper cutter. Means are provided for so modifying the displacement speed of the cutters that plates or sheets can be fed through the shears at a uniform speed.

6 Claims, 11 Drawing Figures

Patented June 26, 1973  3,741,059

3 Sheets-Sheet 1

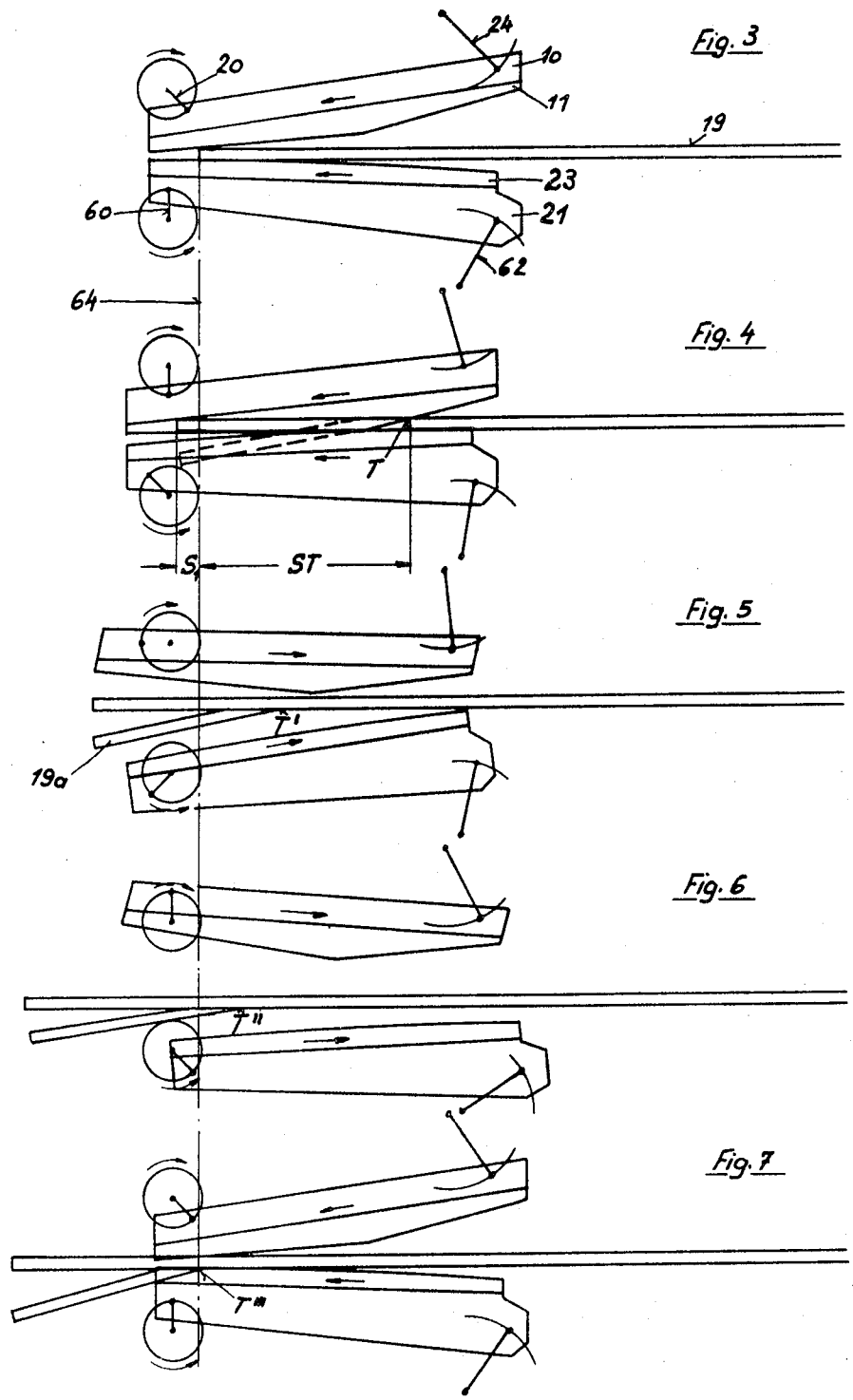

FLYING SHEARS FOR TRIMMING METAL PLATES AND SHEETS

The invention relates to a flying shears with elongated cutters which are disposed parallel to the feed direction of plates or sheets to be trimmed and which are moved in a reversing manner, the cutters being mounted in cutter carriers which are pivotally connected to rotatably supported cranks and which form a coupling link of a crank drive.

Flying trimming shears are known which have two straight cutters and, in analogy with known parallelogram shears for travelling rod material, continuously rotating cranks; however, the crank radius is relatively large owing to the cutter overlap made necessary by the straight cutters. In this case the mass forces to be controlled during a rotation of the cranks are also correspondingly large, because the cutter carriers must be of bending resistant and therefore massive construction for receiving the cutting pressure. Moreover, the known flying trimming shears with two cutters inclined relatively to a horizontal plane are unsuitable for use as dividing shears since in particular in this case a large overlap of the cutters at the end of the cut would lead to unacceptable deformations of the plate edges. (German Pat. No. 1,201,658).

It is an object of the invention to provide a flying trimming shears of the kind referred to above wherein the mass or inertia forces occuring during continuous operation are reduced need for reducing the throughput through the shears by lowering the trimming speed.

The invention consists in the use of crank rocker drive for displacing at least the upper cutter carrier, wherein the one end of the latter adjacent to the plate exit is connected to a continuously driven crank, and the other end is connected to a rocker member of the crank rocker drive, the length of which rocker member is larger than the crank radius by such amount that the pivot angle of the rocker member extends from a position at the beginning of the cut in which the rocker member is displaced against the plate feed direction, to approximately the dead point position of the rocker member, the crank being rotatable about a bearing which has a smaller spacing from the plate plane than the bearing about which the rocker is pivotal.

A crank rocker drive is a special constructional form of a crank drive with the features that the crank radius is smaller than the base, i.e., the distance between the crank bearing and the rocker member bearing, and that the crank radius is smaller than the length of the rocker member the length of the rocker member in turn being smaller than the coupling tie, i.e., the connection between the crank pin and the free end of the rocker member.

The use according to the invention of such crank rocker drive for displacing at least one cutter carrier of the flying trimming shears has the effect that during a crank rotation the cutter carrier is not displaced parallel to itself in a reversing manner, whereby considerable inertia forces would be produced, but that the cutter carrier becomes a kind of push rod of a crank drive and is so displaced that it travels on a circular path only at its end adjacent to the crank, but is displaced more or less in a translatory manner at its other end. The inertia forces occurring are therefore produced in a manner which resembles closely to the occurrence of forces in a crank drive with a rectilinearly guided push rod end.

The crank rocker drive in which the rotating crank is arranged at the outlet end of the shears provides the further advantage that the cutter end which starts a cut begins its return stroke as soon as it has performed its cutting stroke, i.e., after the lower dead point position of the crank, whereas the more remote region of the cutter still cuts owing to a kind of enforced rocking movement of the cutter. Therefore, the cutter overlap is kept small and the shears according to the invention is therefore suitable also as a dividing shears.

In the simplest case the lower cutter may have a rectilinear horizontal cutting edge and may be supported by a reciprocatorily displaceable table. The displacement drive for the table in the feed direction of the plate, i.e., in the forward direction, should be so arranged that it can be overridden or modified by the actual horizontal speed imparted to the plate by the cutting force, because the horizontal speed of the crank pin connected to the upper cutter carrier, and thus the feed speed of the plate driven by the cutters, is subjected to a sinusoidal change so that the lower cutter or the support table thereof must be capable of adapting itself during the cut to the sinusoidally changing plate speed in order to avoid slip movement between the plate and the lower cutter during a cut. The displacement drive for the displaceable table therefore must not be rigid during the forwardly directed displacement but must be adapted to be overridden or modified by the actual plate speed.

The invention comprises also measures for flying trimming or dividing plates fed at an uninterrupted uniform speed imparted to the plates for example by driving rollers. An uninterrupted uniform plate feed speed is required when the edge strips travel through flying or rotating cropping shears as in continuously operating circular cutting shears, wherein the cutterspeed of the cropping shears must be matched to the speed of the plate, but cannot normally be adapted to a varying feed speed.

In order to solve the problem of utilizing an uninterrupted uniform plate feed, the invention provides a drive between the continuously running driving motor and the crank, which drive converts the sinusoidally changing horizontal speed of the crank pin into a uniform speed at least over the rotary angle during which the cutters effect a cut. Such drive is known per se, for example, as an eccentric crank drive the construction of which will be explained in detail below.

However, it must be remembered that the flying trimming shears according to the invention is not limited to a uniform speed of the plate during the cut, because the fact can be relied on that the plate which has been supplied by a rollway and under certain circumstances by pairs of driving rollers is clamped between the cutters after the start of the cut in such manner that the horizontal speed of the crank pin determines the plate speed. This would mean that the effect of driving rollers with constant speed would have to be removed at the start of the cut.

The push rod-like oscillatory movement of the upper cutter carrier displaced by a crank rocker drive has the consequence that towards the end of the cutting stroke, that is to say when the crank is in the region of its lower dead point the straight upper cutter changes from a displacement "parallel to itself" to a kind of rocking movement. Thereby the cut would process with the cutting angle decreasing and the cutting force increasing in an unacceptable manner. In order to control these particular conditions the invention provides that the upper cutter has a straight cutting edge which forms the cutting angle with the plate surface when the crank is in a position of approximately 45° ahead of its lower dead point, and continuing therefrom a cutting edge extension which is directed away from the plate. When the rocking movement of the upper cutter starts, this extension forms with the plate a cutting angle which is still acceptable.

Instead of disposing a straight lower cutter on a table which is forwardly displaceable in step with the plate, whereby the cutter would slide on the plate underside during the return movement of the displaceable table unless the plate were lifted, the lower cutter is provided according to the invention with a curved cutting edge, and the lower cutter carrier is also constructed as a coupling tie or link of crank rocker drive, wherein a crank of the latter is driven oppositely to the crank of the upper cutter carrier is wherein the crank of the lower cutter carrier leads by so much on the crank of the upper cutter carrier that the crank of the lower cutter carrier is already in the upper dead point position when the upper cutter starts its cutting stroke. Because of the offset disposition of the cranks the instantaneous horizontal speeds of the two crank pins are different one from the other, and this would mean a non-permissible displacement of the cutters in their longitudinal direction during the cut. For this reason the movement of each of the two cutter carriers by means of a crank rocket drive can be envisaged only in conjunction with an eccentric crank drive or a similar drive which ensures a uniform horizontal speed of the crank pins in the region of their adjacently located dead point positions.

Figure 2:
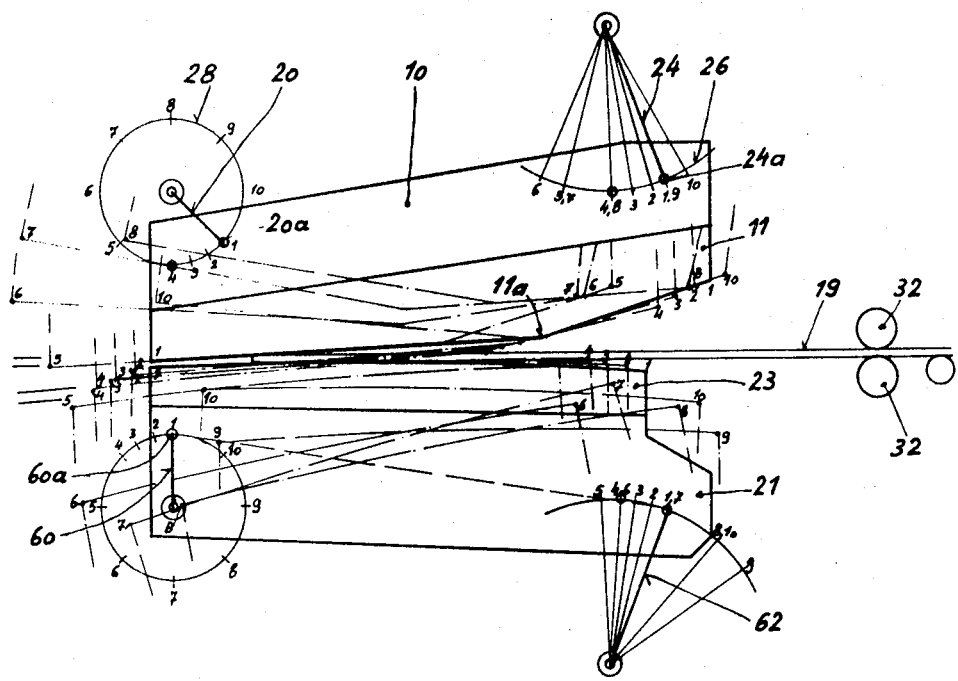
Figure 8:
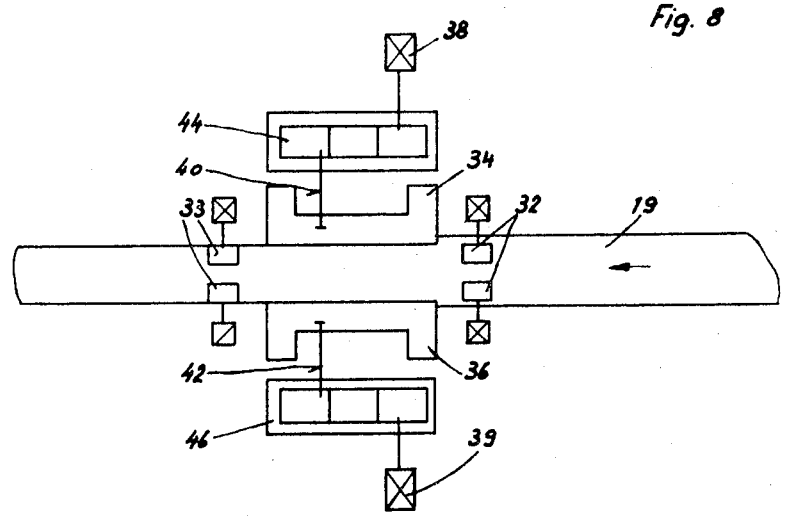
Figure 9:
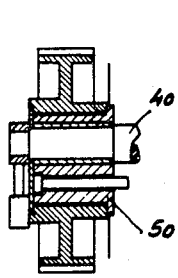
Figure 10:
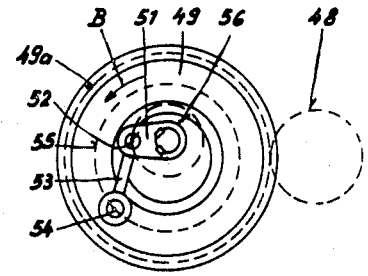
Figure 11:
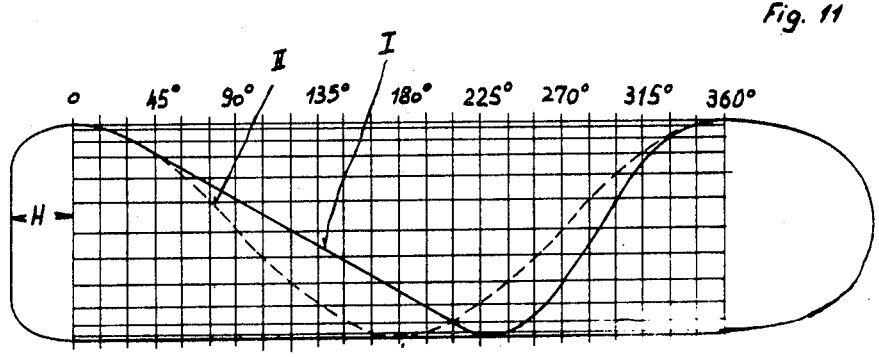

Two embodiments of flying trimming or dividing shears according to the invention are described below by way of example with reference to the accompanying diagrammatic drawings, in which:

FIG. 1 illustrates a shears with a straight lower cutter supported by a displaceable table, FIG. 2 illustrates a shears in which the upper cutter carrier as well as the lower cutter carrier are displaced by a crank rocker drive, FIGS. 3 to 7 illustrates an operating cycle of the shears according to FIG. 2, FIG. 8 illustrates a plan view of a shear line with oppositely disposed flying trimming shears according to the invention, FIGS. 9 and 10 illustrate an eccentric crank drive in vertical section and in side view, respectively, and FIG. 11 is a time-path diagram for the horizontal displacement of a crank pin driven by eccentric crank drive according to FIGS. 9 and 10.

There may be seen in FIG. 1 an upper cutter carrier 10 with an upper cutter 11, and a lower cutter carrier 13 with a straight lower cutter 14. The lower cutter carrier 13 is fixed to a table 15 which is reciprocatorily driven on a track 17 on which it is easily displaceable owing to rollers 16, the drive means being preferably a hydraulic adjusting motor (not illustrated) the piston rod 18 of which is connected to the table 15.

Having regard to the feed direction V of a plate 19 to be trimmed, the upper cutter carrier 10 is connected at its plate exit and to a crank pin 20a of a continuously rotating crank 20. The crank 20 is supported in a bearing 22 which is mounted in the shears frame (not illustrated).

At the other end adjacent to the plate inlet, the upper cutter carrier 10 is connected at a point 24a to a rocker member 24 the pivot bearing 25 of which is located in the shears frame.

The base S, i.e., the connection between the two stationary bearings 22, 25, the coupling tie or link Ko, i.e., the connection constituted by the upper cutter carrier 10 between the points 20a and 24a, the rotating crank 20 and the rocker member 24 together form a so-called crank rocker drive so that the upper cutter carrier 10 with its upper cutter 11 performs during a rotation of the crank 20 a push rod-like oscillatory movement about the pivot point 24a which latter moves on a circular arc 26. The crank pin 20a moves on a circle 28.

FIG. 1 — as well as FIGS. 2 and 3 — illustrate the position of the crank rocker drive and of the upper cutter carrier 10 with the upper cutter 11 at the start of a cut, i.e., at the start of an operating cycle.

At the start of the cut, and taking into account the rotary direction indicated in FIG. 3 by the arrow, the crank 20 is located in a position approximately 45° ahead of the lower dead point $u$, T. The rocker member 24 assumes in this case a position displaced in opposition to the plate feed direction V. In this starting position the straight cutting edge of the upper cutter 11 as far as a point 11a forms with the surface of the plate 19 a cutting angle $\alpha$. Beyond the point 11a the cutting edge is continued as a cutting edge extension directed away from the plate and extending to a point 1 which defines a point of the cutter 11 corresponding to the rotary or pivotal starting position of the crank 20 and of the rocker member 24, respectively.

For illustrating and explaining the kinematic conditions of the crank rocker drive for the upper cutter carrier 10, reference is made for reasons of clarity to FIG. 2. Therein, positions 1 to 10 of the crank pin $20q$ are indicated on the crank circle 28 of the rotating crank 20 and these positions correspond to positions 1 to 10 of the pivot point 24a of the rocker member 24. The points 1 to 10 on the circular arm 26 are the intersection points with circular arcs which are drawn around the points 1 to 10 on the crank circle 28 with the length of the coupling tie Ko as radius.

For illustrating the cutting process it is essential to follow the movement of the cutting edge of the upper cutter 11 during one crank rotation. The cutting edge of the upper cutter 11 is defined in the position 1 of the crank 20 and of the rocker member 24 by the two end points 1 as well as the point 11a. As the crank pin 20a travels from its rotary position 1 through its successive rotary positions 2 to 10, the cutting edge is displaced in the manner illustrated by dash dotted lines having the end points 2 to 10.

It will be seen that the region of the straight cutting edge to the left of the point 11a effects a cut at an approximately constant cutting angle $\alpha$ (FIG. 1) and at the same time moves towards the left for a flying cut in agreement with the plate feed. When, however, the crank pin 20a has arrived at its lower dead point (crank position 4) the rocking movement proper of the upper cutter carrier 10 around the pivot point 24a of the rocker member 24 starts while the point 11a of the cutting edge of the upper cutter 11 is still located below the surface of the plate 19. If the cutting edge of the upper cutter 11 were to continue straight beyond the point 11a, the cutting angle α would decrease towards the end of the cut owing to the rocking movement of the upper cutter carrier 11 to such extent that the cutting pressure would increase considerably. In order to avoid this, the continuation of the cutting edge beyond the point 11a is directed away from the plate so that a favourable cutting angle between the cutter and the plate is obtained even with the rocking movement performed between the crank positions 4 and 5. The same effect is obtained when the upper cutter is provided with a curved cutting edge.

Reverting to FIG. 1 it must be remembered that this constructional form having a straight reciprocatorily displaced lower cutter 14 is not limited to a uniform feed speed of the plate 19. When the plate 19 is fed to the shears by means of rollway rollers 30 located at the entry end thereof and is advanced by them to such extent that in the illustrated position the lower cutter 11 begins the cut when the crank drive is started, the plate is clamped between the two cutters 11 and 14 and is then driven in accordance with the sinusoidally changing horizontal speed of the crank in 20a.

The drive for the displaceable table 15 must in this case permit adjustment of the horizontal speed of the table to the resulting plate speed for which reason the drive must be so designed that it can be overridden or modified by the actual horizontal speed imparted to the plate by the cutting force. Whereas the return movement of the table 15 is effected under positive control beginning approximately at the crank position 5 and extending to the crank position 1, the drive in the opposite direction has only an assisting or free running effect. If for improving the feed of the plate 19 a drive roller pair 32 with constant speed is provided at least at the entry end the effect of such drive roller pair must be suppressed when the horizontal speed of the crank pin 20 remains sinusoidal.

The invention, however, provides also measures for adjusting the flying trimming shears to an uninterrupted uniform plate feed speed. In this context reference is made to FIGS. 8 to 11. FIG. 8 illustrates in plan view a part of a shearing line for heavy plates with two oppositely disposed flying trimming shears 34, 36 which trim simultaneously both sides of a uniformly fed plate 19. Driving roller pairs 32 and 33 at the entry and exit ends, respectively, serve for angularly correctly aligned conveyance of the plate. Motors 38, 39 drive shafts 40, 42 of the cranks 20 by way of respective eccentric crank drives 44, 46 the construction and function of which is explained in detail with reference to FIGS. 9 to 11.

A motor pinion which is indicated merely by a broken circle 48 drives a large gearwheel 49 which is mounted on a stationary hub 50 and which is provided with outer teeth 49a. For example, the crank shaft 40 of the crank 20 is eccentrically mounted in the hub 50 and is provided with a lever 51 which is connected by a joint 52 to an eccentric lever 53 which is pivotally fixed to an eccentric pin 54 of the large gearwheel 40. This pin 54 moves in the rotary direction of the arrow B on a circle 55 which is concentric with the hub centre, whereas the joint 52 of the lever 51 describes a circle 56 which is concentric with the crank shaft 40. The eccentricity of the two circles 55, 56 relatively to each other in conjunction with the rigid connection between the two points 52 and 54 on these circles by way of the eccentric level 53 leads to a characteristic of the rotation of the crank shaft 40 which is illustrated in the diagram according to FIG. 11. Therein the line I indicates the time-path line of the horizontal movement of the crank pin 20a of a crank 20 which is driven by a motor 38 or 39 by way of an eccentric crank drive 44, 46 according to FIGS. 9 and 10. Compared with the line II which indicates the sinusoidal course of a normal crank drive, the horizontal speed of a crank pin 20a (FIG. 2) is uniform while the crank travels through an angle of approximately 150° from the position 1 to a location between positions 4 and 5, because the line I is straight between 45° and 195° i.e., has a constant slope. The horizontal component H of the speed course of the crank pin 20a during a stroke of the crank 20 is shown on the left-hand side. In contrast, there may be seen on the right-hand side of the diagram according to FIG. 11 that the plunger speed or the horizontal speed of the crank pin 20a is highly accelerated and decelerated during the return movement of the crank 20.

Reverting to FIG. 2, the intervention of an eccentric crank drive 44, 46 according to FIGS. 9 and 10 leads therefore to a highly uniform horizontal displacement of the upper cutter carrier 10 in agreement with the feed speed of the plate 19 during the cut which begins in the 45° position 1 of the crank pin 20a and finishes approximately between positions 4 and 5. The return of the upper cutter carrier 10 to position 1 by way of positions 6 to 10 takes place at an accelerated speed.

In contrast to the constructional example of a flying trimming shears with the displaceable table 15 according to FIG. 1 there is utilised in the constructional example according to FIG. 2 also a crank rocker drive with a crank 60 and a rocker member 62 for displacing a lower cutter carrier 21 supporting a lower cutter 23. The lower cutter 23, however, has a curved cutting edge because it is to support the plate 19 progressively from the left to the right during the cut. Additionally to the lengthwise movement adjusted to the plate speed, the lower cutter carrier 21 must therefore perform a rocking movement which begins even at the start of the cut.

At the start of the cut, the crank 60 of the lower cutter carrier 21 is therefore located in its upper dead point position and the rocker member 62 is in a rotationally less displaced position than the rocker member 24 of the upper carrier 10. Also in relation to the drive of the lower cutter carrier 21, positions 1 to 10 of the rocker member 62 are shown in accordance with the corresponding positions 1 to 10 of the crank 60 which are analogous in time to the crank positions 1 to 10 of the upper crank rocker drive. Also the positions of the curved cutting edge of the lower cutter 23 are illustrated corresponding to the various crank positions 1 to 10; this may be recognised from the course of the right-hand end point 1 of the lower cutter through the points 2 to 10. The curved cutting edge of the lower cutter 23 rolls without friction on the underside of the plate with simultaneous longitudinal offset in accordance with the plate feed, for which purpose it is necessary that only the crank 20, but also the crank 60 is driven by an eccentric crank drive according to FIGS. 9 and 10 or a similar non-uniform drive. The necessity for making the horizontal speed of the crank pins 20a and 60a uniform from the lead of the crank 60 relatively to the crank 20.

FIGS. 3 to 7 illustrate an operating cycle of a flying trimming shears according to the invention in accordance with FIG. 2. FIG. 3 illustrates the start of the cut with the upper crank 20 in the 45° position and with the lower crank 60 in the upper dead point position. The start of the plate, which is at the same time the start of the cut, is indicated by a vertical line 64 which extends through all figures. In FIG. 4 the cranks have travelled through a path corresponding to a rotary angle of approximately 45°. The cut has proceeded in opposition to the feed direction of the plate to an instantaneous intersection point T through a distance $S_T$ during constant feed, i.e., during an eccentric path S1. FIGS. 5 and 6 illustrate the cutter carrier movement during the return movement of the crank rocker drive with uniform displacement of the instantaneous intersection point T to T' and T'' respectively. Also the severed edge strip 19a which is still attached to the plate can be seen.

The cutter carriers 10, 21 have returned in FIG. 7 to the starting position according to FIG. 3 in which the instantaneous intersection point has attained approximately the position T'''. The cut is continued by a further operating cycle.

The edge strip 19a may be supplied by a guide to a flying or rotating cropping shears. However, the edge strip may alternatively be severed shortly before the start of the cutting phase according to FIGS. 3 or 7 by the shears itself by means of transverse cutters disposed at the exit end of the cutters 11, 23.

We claim:

1. A flying shears comprising an elongated upper cutter means supported in an upper cutter carrier, and an elongated lower cutter means supported in a lower cutter carrier, said cutter means extending parallel to the feed direction of a plate or sheet to be trimmed, at least said upper cutter carrier being connected to its one end adjacent to the plate exit to a crank member, driving means being provided for continuously rotating said crank member around a bearing point, and said upper cutter carrier being connected at its other end adjacent to the plate inlet to a rocker member pivotal about a pivot point, said rocker member being longer than said crank member by such amount that as said crank member rotates said rocker member is pivotally reciprocated between a position thereof swung out in opposition to said plate feed direction and approximately a dead point position thereof, and said bearing point having a smaller spacing than said pivot point from the feed plane of said plate or sheet, said cutter carrier, crank member, rocker member and driving means constituting a crank rocker drive for effecting reciprocatory displacement of said cutter means.

2. A shears according to claim 1, wherein the lower cutter has a straight horizontal cutting edge and is supported by a table which is adapted to be reciprocated.

3. A shears according to claim 2, wherein the displacement drive for the table in the feed direction of the plate can by overridden or modified by the actual horizontal speed imparted to the plate by the cutting force.

4. A shears according to claim 1, wherein the upper cutter has a straight cutting edge which forms the cutting angle with the surface of the plate in the position of the crank approximately 45° ahead of its lower dead point, and has a cutting edge extension which is directed away from the plate feed plane.

5. A shears according to claim 1 for uninterrupted uniform plate feed speed, wherein a drive is provided between the continuously running driving motor and the crank which converts the sinusoidally varying speed of the horizontal displacement of the crank pin into a uniform speed at least while the crank pin travels through the angular arc during which the cutters cut.

6. A shears according to claim 1 wherein the lower cutter has a curved cutting edge and the lower cutter carrier is the coupling link of a crank rocker drive similar to the upper cutter carrier, wherein cranks of the upper and the lower drive are oppositely driven and the crank of the lower cutter carrier leads on the crank of the upper cutter carrier to such extent that the crank of the lower cutting carrier is already in its lower dead point when the upper cutter begins its cutting stroke.

* * * * *